United States Patent
Patel et al.

(10) Patent No.: US 6,610,397 B1
(45) Date of Patent: Aug. 26, 2003

(54) HEAT-ACTIVATABLE ALKALI-REMOVABLE LABELLING SYSTEMS

(76) Inventors: Mukund R. Patel, 6 Marlboro Rd., Hudson, MA (US) 01749; Robert E. Lafler, 1 Carpenter Hill Rd., Charlton, MA (US) 01508

( * ) Notice: Subject to any disclaimer, the term of this patent is extended or adjusted under 35 U.S.C. 154(b) by 0 days.

(21) Appl. No.: 09/812,460

(22) Filed: Mar. 20, 2001

Related U.S. Application Data
(60) Provisional application No. 60/191,135, filed on Mar. 22, 2000.

(51) Int. Cl.[7] .............................. B32B 15/04; C09J 7/12
(52) U.S. Cl. ................... 428/343; 428/346; 428/355 R; 428/352; 428/41.8; 428/41.6; 428/40.1; 428/42.1
(58) Field of Search ................... 428/343, 346, 428/355 R, 352, 41.8, 41.6, 40.1, 42.1

(56) References Cited

U.S. PATENT DOCUMENTS

| | | | |
|---|---|---|---|
| 4,948,822 A | * 8/1990 | Iovine et al. | 523/201 |
| 5,094,912 A | * 3/1992 | Deibig et al. | 428/355 |
| 5,800,656 A | 9/1998 | Geurtsen et al. | |
| 5,824,176 A | * 10/1998 | Stein et al. | 156/239 |
| 6,033,763 A | 3/2000 | Laprade et al. | |
| 6,099,944 A | 8/2000 | Laprade et al. | |

FOREIGN PATENT DOCUMENTS

WO     WO 98/00291     * 1/1998 .................. 428/343

OTHER PUBLICATIONS

J. Schwartz, "Labelled for Growth", Advertising Age, Nov., 1999, 45–47.
Belland Inc. Advertisement, "Labels with a solution", undated (5 pages).

* cited by examiner

Primary Examiner—Daniel Zirker
Assistant Examiner—Victor S. Chang
(74) Attorney, Agent, or Firm—Cowan, Liebowitz & Latman; Mark Montague

(57) ABSTRACT

A heat-activatable, alkali-removable labelling system comprises a support portion and a transfer portion over said support portion for transfer of the transfer portion from the support portion to an article upon application of heat to the support portion while the transfer portion is placed in contact with the article. The transfer portion comprises an optional, optionally alkali-removable, organic solvent soluble acrylic protective layer; an optionally alkali-removable, organic solvent soluble ink layer over said protective layer; and an alkali-removable, heat-activatable, organic solvent soluble acrylic adhesive layer over said ink layer.

17 Claims, 1 Drawing Sheet

HEAT-ACTIVATABLE ALKALI-REMOVABLE LABELLING SYSTEMS

This patent application is based upon co-pending U.S. Provisional Patent Application Ser. No. 60/191,135, filed Mar. 22, 2000, incorporated herein by reference.

FIELD OF THE INVENTION

This application is directed to coating systems for applying labels to bottles. More particularly, this application is directed to heat-activatable, alkali-removable labelling systems formed from blends of high acid acrylic resins. The labels produced can be rapidly and completely removed in an environmentally friendly manner by heated aqueous alkaline solutions.

BACKGROUND OF THE INVENTION

With the increasing emphasis on environmental protection, reduction of landfill disposal areas, and the economic advantages of recycling containers, there is interest in environmentally friendly labelling systems, especially ones where labels are removable in aqueous alkaline solutions. Known alkali-removable labelling systems have been formulated from alkaline solutions of casein, which systems have the disadvantages of degradation and discoloration upon exposure conditions of heat and aging. Furthermore, such systems are not thermoplastic, a property that necessitates application of label adhesives prepared for these compositions by direct gluing rather than by melting and heat activation.

A further deficiency in such known labelling systems has been the slow and incomplete removal of labels and label adhesives from the containers to which they have been attached. Also, in the case of heat-transferred "paperless" labels, the alkali-removable protective top coatings have exhibited poor visual appearance resulting from cracking on aging and developing surface scratches from abrasion encountered during friction due to the containers being in close contact while moving on the production line.

Thus, there is a need for better labelling systems in which labels can be rapidly and completely removed.

OBJECTS OF THE INVENTION

It is an object of the invention to provide an environmentally friendly labelling system.

It is also an object of the invention to provide a heat-activatable, alkali-removable labelling system.

It is a further object of the invention to provide a method of producing abrasion-resistant, protective topcoats, inks, and heat-activatable adhesive formulations that produce non-hazing, clear, glossy films under conditions of pasteurization and immersion in ice water.

These and other objects of the invention will become more apparent from the discussion below.

SUMMARY OF THE INVENTION

The current invention achieves the desired characteristics of alkali-removability, heat activation, and abrasion resistance by utilizing solutions of blends of high acid acrylic resins with other harder acrylic resins thereby resulting in formulations low enough in viscosity for application by flexographic or gravure coaters and presses. The dried films of these products have excellent interlayer adhesion, and, in the case of the adhesive coating, sufficiently low softening point, high wet tack, non-blocking in the dried film, and provide excellent adhesion to plastic, glass, and metal containers.

According to a first embodiment of the invention, a heat-transfer label is particularly well-suited for use on silane-treated glass containers of the type that are subjected to pasteurization conditions, regardless of whether the glass containers have previously been pre-treated with polyethylene, oleic acid, stearate or the like. The heat-transfer label comprises (a) a support portion comprising a sheet of paper overcoated with a release layer of polyethylene and (b) a transfer portion over said support portion for transfer of the transfer portion from the support portion to an article upon application of heat to the support portion while the transfer portion is placed into contact with the article. The transfer portion comprises (i) an optionally alkali-removable protective lacquer layer, (ii) an optionally alkali-removable ink layer over said protective lacquer layer; and (iii) an alkali-removable, heat-activatable adhesive layer over said ink layer. Preferably the adhesive layer comprises an adhesive of the type present in a solvent- or water-based adhesive form or in a water-based adhesive dispersion. Each layer comprises one or more acrylic resins.

In a second embodiment of the invention the heat-transfer label comprises (i) an optional, optionally alkali-removable protective lacquer layer, (ii) an optionally alkali-removable ink layer over said protective lacquer layer, (iii) a substrate, and (iv) an alkali-removable, heat-activatable adhesive layer.

According to another aspect of the invention, the heat-transfer label is particularly well-suited for use on aluminum cans that have been treated with a highly-lubricating acrylic coating or varnish of the type used to prevent scratching and abrasion of such cans (said varnish either being used alone or in combination with a white ink), said heat-transfer label comprising (a) a support portion comprising a sheet of paper overcoated with a release layer of polyethylene and (b) a transfer portion over said support portion for transfer of the transfer portion from the support portion to an article upon application of heat to the support portion while the transfer portion is placed into contact with the article.

In addition to being directed to the above-described heat-transfer portion of the heat-transfer labels, as well as to the adhesive compositions used to form the adhesive layers of the heat-transfer labels, the invention is directed to methods for forming the adhesive layers with the aforementioned adhesive compositions, to the adhesive layers formed using the foregoing adhesive compositions, and to methods of labelling surfaces with the above-described heat-transfer labels.

It is to be understood that certain terms used herein, such as "on" or "over", when used to denote the relative positions of two or more layers of a heat-transfer label, are primarily used to denote such relative positions in the context of the way in which those layers are situated prior to transfer of the transfer portion of the label to an article since, after transfer, the arrangement of layers is inverted as those layers which were furthest removed from the associated support sheet are now closest to the labelled article.

The current invention achieves the desired characteristics of alkali-removability, heat activation, and abrasion resistance by utilizing solutions of high acid acrylic resins and/or blends with other harder acrylic resins thereby resulting in formulations low enough in viscosity for application by flexographic or gravure coaters and presses. The dried films of these products have excellent interlayer adhesion, and, in the case of the adhesive coating, sufficiently low softening point, high wet tack, non-blocking in the dried film, and provide excellent adhesion to plastic, glass, and metal containers.

DETAILED DESCRIPTION OF THE INVENTION

Figure 1:
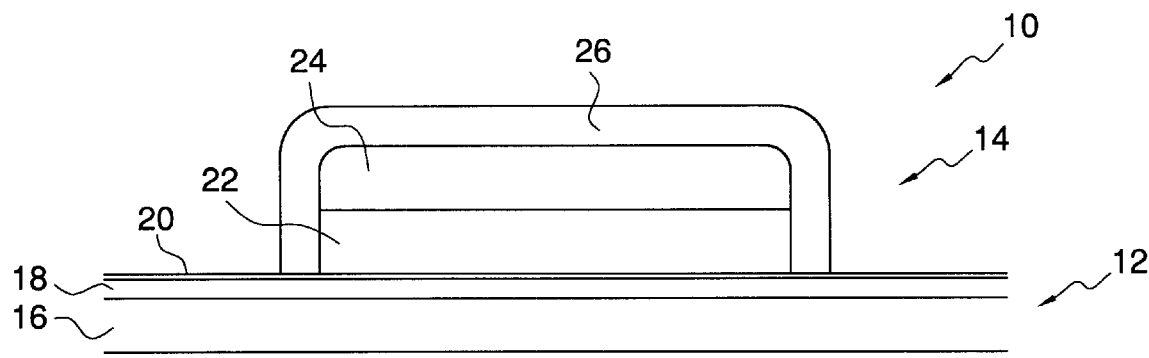
FIG. 1 is a schematic cross-sectional view of one embodiment of the invention.

The invention herein can perhaps be better appreciated by making reference to the drawings. FIG. 1 represents a schematic cross-sectional view of a first embodiment of a heat-transfer label according to the invention. Heat-activatable label 10 comprises a support portion 12 and a transfer portion 14. Support portion 12, in turn, comprises a substrate or carrier web 16 overcoated with a polyethylene release layer 18. Carrier web 16 is typically made of paper or a similarly suitable substrate. Details of the composition and preparation of polyethylene layer 16 are disclosed, for example, in U.S. Pat. Nos. 4,935,300, and 4,927,709, both of which are specifically incorporated herein by reference.

Label 10 optionally comprises a skim coat 20, which is coated directly on top of the entirety of polyethylene layer 18. During label transfer, a small portion of skim coat 20 may be transferred along with the transfer portion 14 of label 10 onto the article being labelled, the amount of skim coat 20 transferred onto the article being labelled not being readily discernible.

Transfer portion 14 comprises an optional, optionally alkali-removable, organic solvent soluble acrylic protection layer 22 printed directly on top of polyethylene layer 18 or skim coat 20, an optionally alkali-removable organic solvent soluble ink design layer 24 printed onto a desired area of protective layer 22, and an alkali-removable, heat-activatable, organic solvent soluble acrylic adhesive layer 26 printed onto ink design layer 24.

Figure 2:
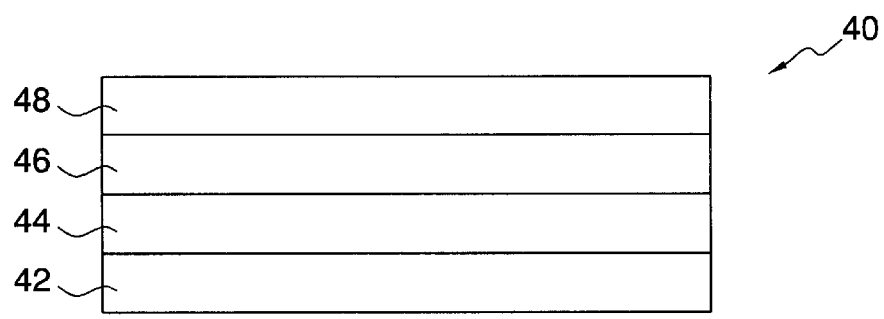
FIG. 2 is a schematic cross-sectional view of another embodiment of the invention.

In FIG. 2, heat-activatable label 40 comprises an optional, optionally alkali-removable, organic soluble acrylic protective layer 42, an optionally alkali-removable, organic solvent soluble ink design layer 44 printed onto a desired area of protective layer 42, a substrate layer 46, and an alkali-removable, heat-activatable, organic solvent soluble acrylic adhesive layer 48 printed onto substrate layer 46.

The coating compositions utilized in the above-described applications are comprised of solutions of single component or blends of acrylic resins having varying degrees of alkaline solubility and film hardness. Protective lacquer layer 22 or 42 preferably comprises one or more suitable alkali-soluble, organic solvent soluble acrylic resins. One of the alkaline-soluble acrylic resins found particularly useful in the formulations is a proprietary, solid, all acrylic, low molecular weight resin with a Tg of 70° C. and an acid number of 100. This resin, known as CARBOSET 526, is manfactured by B.F. Goodrich Specialty Chemicals, 9911 Brecksville Road, Cleveland, Ohio 44141-3247.

A second example of a useful alkaline-soluble acrylic resin is a proprietary, high molecular weight (Mw of 12,500) solid, styrene acrylic resin with a Tg of 73° C., an acid number of 213 and a ring and ball softening point of 160° C. This resin, identified as JONCRYL 67, is manufactured by S.C. Johnson and Sons, Inc., Racine, Wis. 53403-5011.

A third example of an alkaline-soluble, organic solvent soluble, solid acrylic resin found useful for this application is a styrene terpolymer with acrylic acid and acrylic ester supplied by Belland Inc., 250 Clark Street, North Andover, Ma. 01845-1018, under the name GBC 8504.

Two additional hard, high molecular weight acrylic resins incorporated into the protective layer for the purpose of increasing abrasion resistance and water resistance are proprietary resins supplied by Rohm and Haas Company, 100 Independence Mall West, Philadelphia, Pa. 19106-2399. The first of these, PARALOID® A-21, is extremely hard, methyl methacrylate polymer with a molecular weight (Mw) of 120,000, solubility parameter of 9.4, and a Tg of 105° C. The second, PARALOID B-44, is a methyl methacrylate/ethyl acrylate copolymer adhesive resin with a molecular weight (Mw) of 140,000, solubility parameter of 9.8, and a Tg of 60° C.

To form protective layer 22 or 42, a lacquer composition comprising one or more suitable acrylic resins dissolved in one or more suitable volatile organic solvents is deposited onto a desired area of polyethylene layer 18 or skim coat 20 or a hard surface, preferably applied by gravure printing or a similar technique. After deposition of the lacquer composition, the volatile solvent(s) evaporate(s), leaving only the non-volatile resin components thereof to make up protective layer 22 or 42.

A number of organic solvents well known to those in the art can be used. However, the solvents isopropanol (isopropyl alcohol, C.A.S. #67-63-0) and methyl ethyl ketone (C.A.S. #78-93-3) are preferably used in these formulations according to the invention.

The protective layer lacquer composition comprises a total of from 5 to 40% by weight, based upon the total weight of the composition, of one or more acrylic resins, and a total of from 60 to 90% by weight of one or more organic solvents, water, an aqueous solution, or a mixture of two or more thereof. Small amounts of surfactants, dispersants, or other conventional components may be present as well. The protective layer resulting after evaporation will comprises a total of from about 50 to 100% by weight, based upon the total weight of the layer, of one or more acrylic resins.

Ink design layer 24 of transfer portion 14 preferably comprises one or more acrylic inks. Ink design layer 24 is formed in the conventional manner by depositing, by gravure printing or the like, an ink composition comprising an acrylic resin of the type described above, a suitable pigment or dye and one or more suitable volatile organic solvents onto one or more desired areas of lacquer layer 22. After application of the ink composition onto lacquer layer 22, the volatile organic solvent component(s) of the ink solvent system evaporate(s), leaving only the non-volatile ink components to form layer 24. A preferred example of a suitable resin for use in forming an acrylic ink is CARBOSET 526.

A number of known pigments are compatible in inks formulated using the above-described acrylic resin solutions. Representative examples of such pigments include, but are not limited to Raven 1040 carbonblack, (CI pigment black 7) supplied by Columbian Chemicals Company, 1600 Parkwood Circle, Atlanta, Ga. 30339; Kronos 2020 Titanium dioxide (C.I. pigment white 6) supplied by Kronos Inc., 6825 Northchase Drive, Houston, Tex. 77060; Heliogen Blue D7072DD (C.I. pigment blue 15:3) supplied by BASF Colorants, P.O. Box 75908M, Charlotte, N.C. 28275; and 13-3151 permanent carmine FBB-02 (C.I. pigment red 146) supplied by Clariant Corporation, 500 Washington Street, Coventry, R.I. 02816.

As a means of improving dispersing of pigments in solutions of these resins, the addition of 0.25% of Disperse AYD-1 has proven to be effective. This is a proprietary blend of seventy-five percent by weight of a modified alkyd dispersion in mineral spirits (C.A.S. #64742-88-7) and is manufactured by Elementis Specialties, 400 Claremont Avenue, Jersey City, N.J. 07304. BYK 346 is a proprietary silicone surfactant manufactured by BYK-Chemie USA, 524 South Cherry Street, Wallingford, Conn. 06492. FLUORAD FC-430 is a proprietary fluorosurfactant manufactured by the 3M Speciality Chemicals Division of 3M Co. of St. Paul, Minn. 55144-1000.

The ink design layer composition comprises a total of from 5 to 50% by weight, based upon the total weight of the composition of one or more acrylic resins, and a total of from 60 to 90% by weight of one or more organic solvents, water, an aqueous solution, or a mixture of two or more thereof. Small amounts of surfactants, dispersants, or other conventional components may be present as well. The ink layer resulting after evaporation will comprise a total of from about 50 to 100% by weight, based upon the total weight of the layer, of one or more acrylic resins.

Adhesive layer 26 of transfer portion 14 comprises an acrylic adhesive of the type present in a solvent-based or water-based adhesive solution or a water-based adhesive dispersion of a suitable acrylic resin, such as one or more of the acrylic resins described herein. Adhesive layer 26 is formed by depositing onto ink layer 24, by gravure printing or the like, an adhesive composition comprising an acrylic adhesive solution or dispersion and, preferably, a surface tension lowering agent. After application of the adhesive composition onto ink layer 24, the volatile components of the composition (e.g., water, organic solvent) evaporate, leaving only the non-volatile solid components thereof to form layer 26.

The adhesive layer composition comprises a total of from 15 to 45% by weight, based upon the total weight of the composition of one or more acrylic resins, and a total of from 60 to 85% by weight of one or more organic solvents, water, an aqueous solution, or a mixture of two or more thereof. Small amounts of surfactants, dispersants, or other conventional components may be present as well. The adhesive layer resulting after evaporation will comprise a total of from about 70 to 100% by weight, based upon the total weight of the layer, of one or more of the acrylic resins.

The labels prepared according to the invention are particularly well-suited for, but not limited to, use on silane-treated glass containers of the type that are subjected to pasteurization conditions. It is to be understood that, for purposes of the present specification and claims, the expression "silane-treated glass containers" refers both to silane-treated glass containers" refers both to silane-treated glass containers that have been pre-treated with an abrasion resistant material, such as polyethylene, olecic acid, stearate or the like, and to silane-treated glass containers that have not been so pre-treated.

As a means of more completely removing the multilayer label composition in a shorter time during immersion of the labeled substrate in the heated aqueous alkaline solution, about five to twenty five percent by weight of the solid acrylic resin material may be replaced with a hot water soluble material such as 3,3,7,7-tetra-hydroxymethyl-5-oxanonane that is a solid material melting at 106° to 111° C., having two percent solubility in water at 20° C., and fifty percent solubility in water at 65° C. This product, di-trimethylol-propane, is supplied by Perstorp Polyols, Inc. 600 Matzinger Rd., Toledo, Ohio 43612.

The following are illustrative examples of compositions that may be used to form layers of the heat-activatable labelling system useful according to the invention. It should be understood that other acrylic resins and compositions of the general type described above may also be used to form layers and that the examples given below are in no way intended to be limiting:

EXAMPLES

EXAMPLE 1

| Composition for Grinding Vehicles for Inks | % BY WEIGHT |
| --- | --- |
| ISOPROPANOL | 40 |
| METHYL ETHYL KETONE | 20 |
| CARBOSET 526 | 24 |
| JONCRYL 67 | 16 |
|  | 100 |

EXAMPLE 2

| Adhesive Layer Composition | % BY WEIGHT |
| --- | --- |
| METHYL ETHYL KETONE | 72 |
| CARBOSET 526 | 28 |
|  | 100 |

EXAMPLE 3

| Adhesive Layer Composition | % BY WEIGHT |
| --- | --- |
| METHYL ETHYL KETONE | 72 |
| BELLAND GBC-8304 | 28 |
|  | 100 |

EXAMPLE 4

| Composition for Abrasive Resistant Protection Layer | % BY WEIGHT |
| --- | --- |
| METHYL ETHYL KETONE | 70.0 |
| PARALOID B-44 | 7.5 |
| PARALOID A-21 | 7.5 |
| CARBOSET 526 | 15.0 |
|  | 100.0 |

In Examples 1, 2, 3, and 4, the dry resin or resins are added to the organic solvent component under agitation. The mixture is mixed until the resin or resins dissolve in the organic solvent.

EXAMPLE 5

| Composition for Single Pigment Black Ink Layer | % BY WEIGHT |
| --- | --- |
| ISOPROPANOL | 43.95 |
| METHYL ETHYL KETONE | 22.60 |
| CARBOSET 526 | 15.12 |
| JONCRYL 67 | 10.08 |
| DISPERSE AYD #1 | 0.25 |
| RAVEN 1040 | 8.00 |
|  | 100.00 |

EXAMPLE 6

| Multi Agent Ink Composition | % BY WEIGHT |
| --- | --- |
| ISOPROPANOL | 43.95 |
| METHYL ETHYL KETONE | 22.60 |
| CARBOSET 526 | 15.12 |
| JONCRYL 67 | 10.08 |

EXAMPLE 6-continued

| Multi Agent Ink Composition | % BY WEIGHT |
|---|---|
| DISPERSE AYD #1 | 0.25 |
| PERMANENT CARMINE FBB-02 | 7.00 |
| HELIOGEN BLUD D7072DD | 1.00 |
| | 100.00 |

EXAMPLE 7

| Composition for Single Pigment White Ink | % BY WEIGHT |
|---|---|
| ISOPROPANOL | 26.0 |
| METHYL ETHYL KETONE | 14.0 |
| CARBOSET 526 | 14.4 |
| JONCRYL 67 | 9.6 |
| DISPERSE AYD #1 | 1.0 |
| KRONOS 2020 | 35.0 |
| | 100.0 |

In Examples 5, 6, and 7, the dry resins are added to the organic solvent component under agitation, and the mixture is mixed until the resins dissolve. Under continued mixing of the solution formed the dispersing agent and the pigment or pigments are added, so that the pigment or pigments are well dispersed.

EXAMPLE 8

| Composition for Adhesive or Protective Layer | % BY WEIGHT |
|---|---|
| WATER | 83.4 |
| 26% AQUEOUS AMMONIA | 6.0 |
| BYK 346 | 0.5 |
| FLUORAD FC-430 | 0.1 |
| CARBOSET 526 | 10.0 |
| | 100.0 |

EXAMPLE 9

| Composition for Adhesive or Protective Layer | % BY WEIGHT |
|---|---|
| WATER | 62.4 |
| 26% AQUEOUS AMMONIA | 7.0 |
| ISOPROPANOL | 10.0 |
| BYK 346 | 0.5 |
| FLUORAD FC-430 | 0.1 |
| JONCRYL 67 | 15.0 |
| CARBOSET 526 | 5.0 |
| | 100.0 |

In Examples 8 and 9, the aqueous ammonia is added to the water. Then, under agitation, the additional components are slowly added. Mixing continues until the additional components dissolve.

EXAMPLE 10

| Adhesive Layer Composition | % BY WEIGHT |
|---|---|
| ISOPROPANOL | 72 |
| JONCRYL 67 | 23.8 |
| DI-TRIMETHYLOLPROPANE | 4.2 |
| | 100.0 |

In Example 10, the dry materials, JONCRYL 67 and di-trimethylolpropane, are added to the organic solvent, isopropanol, under agitation. The mixture is mixed until the solid materials dissolve.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A heat-activatable, alkali-removable labeling system comprising:
   (a) a support portion; and
   (b) a transfer portion directly over and adhered to said support portion for transfer of the transfer portion from the support portion to an article upon application of heat to the support portion while the transfer portion is placed in contact with the article, said transfer portion comprising:
      (i) an alkali-removable, organic solvent soluble acrylic protective layer;
      (ii) an alkali-removable, organic solvent soluble ink layer directly over and adhered to said protective layer; and
      (iii) an alkali-removable, heat-activatable, organic solvent soluble acrylic adhesive layer directly over and adhered to said ink layer;
   wherein the ink layer comprises a solvent-based, alkali-removable ink composition of a colored pigment and a blend of sixty percent by weight of an acrylic, low molecular weight resin having a Tg of 70° C. and acid number of 100 and forty percent by weight of a styrene-acrylic resin with a molecular weight, Mw of 12500, a Tg of 73° C., acid number of 213, and a ring and ball softening point of 160° C., this blend being dissolved in a combination of sixty percent by weight isopropanol and forty percent by weight methyl ethyl ketone in an amount sufficient to obtain a viscosity of the range required for application either in a patterned design or full coverage area by gravure printing or coating equipment.

2. The labelling system of claim 1, wherein support portion (a) comprises a substrate overcoated with a release layer of polyethylene.

3. The labelling system of claim 2, wherein the substrate is paper.

4. The labelling system of claim 1, further comprising a skim coat interposed between said support portion and said transfer portion.

5. The labelling system of claim 1, wherein the ink layer comprises a blend of two or more pigments as colorants.

6. The labelling system of claim 1, wherein the ink design layer comprises from about 50 to 100% by weight, based upon the total weight of the ink design layer, of one or more acrylic resins.

7. A heat-activatable, alkali-removable labeling system comprising:
   (a) a support portion; and
   (b) a transfer portion directly over and adhered to said support portion for transfer of the transfer portion from the support portion to an article upon application of heat to the support portion while the transfer portion is placed in contact with the article, said transfer portion comprising:
      (i) an alkali-removable, organic solvent soluble acrylic protective layer;

(ii) an alkali-removable, organic solvent soluble ink layer directly over and adhered to said protective layer; and (iii) an alkali-removable, heat-activatable, organic solvent soluble acrylic adhesive layer directly over and adhered to said ink layer;

wherein the acrylic protective layer or the adhesive acrylic layer comprises a blend of fifty percent by weight each of an acrylic, low molecular weight resin having a Tg of 70° C., and an acid number of 100, twenty-five percent by weight of a methyl methacrylate polymer having a molecular weight (Mw) of 120,000, solubility parameter of 9.4, a Tg of 105° C., and twenty five percent by weight of a methyl methacrylate/ethyl acrylate copolymer resin having a molecular weight (Mw) of 140,000, solubility parameter of 9.8, and a Tg of 60° C., this blend being dissolved in a sufficient amount of methyl ethyl ketone to obtain a viscosity sufficiently low for application either in a patterned design or full coverage area by gravure printing and coating equipment.

8. The labelling system of claim 7, wherein the acrylic protective layer or the acrylic adhesive layer comprises from about 70 to 100% by weight, based upon the total weight of the layer, of one or more acrylic resins.

9. A heat-activatable, alkali-removable labeling system comprising:

(a) a support portion; and (b) a transfer portion directly over and adhered to said support portion for transfer of the transfer portion from the support portion to an article upon application of heat to the support portion while the transfer portion is placed in contact with the article, said transfer portion comprising:

(i) an alkali-removable, organic solvent soluble acrylic protective layer;

(ii) an alkali-removable, organic solvent soluble ink layer directly over and adhered to said protective layer; and (iii) an alkali-removable, heat-activatable, organic solvent soluble acrylic adhesive layer directly over and adhered to said ink layer;

wherein either alone or in combination, the acrylic protective layer, adhesive acrylic layer, or ink acrylic layer comprises a solution of the acrylic resin in which about five to twenty five percent of the acrylic resin has been replaced with a material having at least substantially 50% solubility in water at substantially 65° C.

10. The labelling system of claim 9, wherein the hot water soluble material is di-trimethylolpropane.

11. A transfer portion of a heat-transfer label comprising:

(a) an alkali-removable, organic solvent soluble acrylic protective layer;

(b) an alkali-removable, organic solvent soluble ink layer directly over and adhered to said protective layer; and (c) an alkali-removable, heat-activatable, organic solvent soluble acrylic adhesive layer directly over and adhered to said ink layer;

wherein the ink layer is a solvent-based, alkali-removable ink composition of a colored pigment and a blend of sixty percent by weight of an acrylic, low molecular weight resin having a Tg of 70° C. and acid number of 100 and forty percent by weight of a styrene-acrylic resin with a molecular weight, Mw of 12500, a Tg of 73° C., acid number of 213, and a ring and ball softening point of 160° C., this blend being dissolved in a combination of sixty percent by weight isopropanol and forty percent by weight methyl ethyl ketone in an amount sufficient to obtain a viscosity of the range required for application either in a patterned design or full coverage area by gravure printing or coating equipment.

12. The transfer portion of claim 11, wherein the acrylic protective layer or the acrylic adhesive layer comprises a solvent-based heat activatable alkali-removable composition comprised of an acrylic, low molecular weight resin having a Tg of 70° C. and an acid number of 100 dissolved in a sufficient amount of methyl ethyl ketone to obtain a viscosity sufficiently low for application either in a patterned design or full coverage area by gravure printing or coating equipment.

13. The transfer portion of claim 11, wherein the acrylic protective layer or the acrylic adhesive layer comprises from about 50 to 100% by weight, based upon the total weight of the layer, of one or more organic solvent soluble acrylic resins.

14. The transfer portion of claim 11, wherein the ink layer comprises a blend of two or more pigments as colorants.

15. The transfer portion of claim 11, wherein the ink design layer comprises from about 50 to 100% by weight, based upon the total weight of the ink design layer, of one or more acrylic resins.

16. A transfer portion of a heat-transfer label comprising:

(a) an alkali-removable, organic solvent soluble acrylic protective layer;

(b) an alkali-removable, organic solvent soluble ink layer directly over and adhered to said protective layer; and (c) an alkali-removable, heat-activatable, organic solvent soluble acrylic adhesive layer directly over and adhered to said ink layer;

wherein the acrylic protective layer or the acrylic adhesive layer comprises a blend of fifty percent by weight each of an acrylic, low molecular weight resin having a Tg of 70° C., and an acid number of 100, twenty-five percent by weight of a methyl methacrylate polymer having a molecular weight (Mw) of 120,000, solubility parameter of 9.4, a Tg of 105° C., and twenty five percent by weight of a methyl methacrylate/ethyl acrylate copolymer resin having a molecular weight (Mw) of 140,000, solubility parameter of 9.8, and a Tg of 60° C., this blend being dissolved in a sufficient amount of methyl ethyl ketone to obtain a viscosity sufficiently low for application either in a patterned design or full coverage area by gravure printing and coating equipment.

17. The transfer portion of claim 16, wherein the acrylic protective layer or the acrylic adhesive layer comprises from about 70 to 100% by weight, based upon the total weight of the layer, of one or more acrylic resins.

* * * * *